(12) United States Patent
Abellan

(10) Patent No.: US 11,860,700 B2
(45) Date of Patent: Jan. 2, 2024

(54) DEVICE FOR TRANSFERRING POWER AND ENTROPY

(71) Applicant: Quside Technologies S.L., Barcelona (ES)

(72) Inventor: Carlos Abellan, Barcelona (ES)

(73) Assignee: QUSIDE TECHNOLOGIES S.L., Barcelona (ES)

( * ) Notice: Subject to any disclaimer, the term of this patent is extended or adjusted under 35 U.S.C. 154(b) by 0 days.

(21) Appl. No.: 17/521,323

(22) Filed: Nov. 8, 2021

(65) Prior Publication Data

US 2022/0057850 A1 Feb. 24, 2022

Related U.S. Application Data

(63) Continuation of application No. PCT/EP2020/063068, filed on May 11, 2020.

(30) Foreign Application Priority Data

May 9, 2019 (EP) ..................................... 19382359

(51) Int. Cl.
*G06F 1/26* (2006.01)
*G06F 7/58* (2006.01)

(52) U.S. Cl.
CPC .............. *G06F 1/266* (2013.01); *G06F 7/588* (2013.01)

(58) Field of Classification Search
CPC ... G06F 1/26; G06F 1/266; G06F 7/58; G06F 7/582; G06F 7/588
See application file for complete search history.

(56) References Cited

U.S. PATENT DOCUMENTS

| 5,001,750 A * | 3/1991 | Kato ..................... H04N 1/4486 380/243 |
| 7,634,522 B1 * | 12/2009 | Carter ................... H04L 9/0869 708/250 |
| 11,561,592 B2 * | 1/2023 | Moritomo ............... G06F 21/85 |
| 2005/0057216 A1 | 3/2005 | Yamaguchi et al. |
| 2007/0214293 A1 | 9/2007 | Gangstoe et al. |
| 2008/0037779 A1 * | 2/2008 | Seman, Jr. .......... H02J 7/00047 380/46 |
| 2013/0191428 A1 * | 7/2013 | Okabayashi ............ G06F 7/582 708/251 |
| 2015/0199176 A1 * | 7/2015 | Idgunji .................... G06F 1/26 708/251 |

(Continued)

OTHER PUBLICATIONS

"USB Power Delivery Changes the Game". White Paper. Jan. 2019. Renesas. (Year: 2019).*

(Continued)

*Primary Examiner* — Thomas J. Cleary
(74) *Attorney, Agent, or Firm* — Edell, Shapiro & Finnan, LLC

(57) ABSTRACT

Apparatuses for transferring power from a power source to a computing device are provided for. The apparatuses include an entropy-generator for generating entropy. The apparatus is adapted for transferring the entropy to the computing device (such as a mobile computing device) when it is connected to the computing device. The device is adapted to power the entropy-generator with power received from the power source. Methods are also provided for. The methods include providing power and/or entropy to a computing device.

14 Claims, 2 Drawing Sheets

(56) References Cited

U.S. PATENT DOCUMENTS

| | | | | |
|---|---|---|---|---|
| 2015/0346792 | A1* | 12/2015 | Rathi | G06F 1/26 |
| | | | | 713/310 |
| 2015/0370299 | A1* | 12/2015 | Waters | G06F 1/26 |
| | | | | 713/310 |
| 2016/0134155 | A1 | 5/2016 | Bennett | |
| 2020/0380477 | A1* | 12/2020 | Dunjic | B60L 53/305 |
| 2021/0399566 | A1* | 12/2021 | Visvesha | H04L 9/3265 |
| 2022/0113945 | A1* | 4/2022 | Abellan | G06F 7/588 |

OTHER PUBLICATIONS

"Usb power delivery changes the game renesas white paper filetype:pdf—Google Search". Google LLC. Retrieved from Internet May 2, 2023. <https://www.google.com/search?q=usb+power+delivery+changes+the+game+renesas+white+paper+filetype%3Apdf&rlz=1C1GCEA_enUS987US987%E2%80%A6>. (Year: 2023).*

"USB PD Power Negotiations". Application Report SLVA842. Nov. 2016. Texas Instruments Incorporated. (Year: 2016).*

"White Papers". Template.net. Retrieved from Internet May 2, 2023. <https://www.template.net/documents/white-papers/>. (Year: 2023).*

"7 Steps to the Perfect White Paper (Template & Examples)". Uplands Software. Retrieved from Internet May 2, 2023. <https://uplandsoftware.com/kapost/resources/blog/white-paper-template/>. (Year: 2023).*

Extended Search Report in corresponding European Patent Application No. 19382359.8, dated Nov. 13, 2019.

Search Report in corresponding International Patent Application No. PCT/EP2020/0630068, dated May 25, 2020.

* cited by examiner

DEVICE FOR TRANSFERRING POWER AND ENTROPY

CROSS REFERENCE TO RELATED APPLICATIONS

This application is a continuation of International Application No. PCT/EP2020/063068, filed on May 11, 2020, which claims priority under 35 U.S.C. § 119 to Application No. EP 19382359.8 filed on May 9, 2019, the entire contents of which are hereby incorporated by reference.

FIELD

The present disclosure relates to devices and apparatuses for transferring power from a power source to a computing device and to methods for providing power and/or entropy to a computing device.

BACKGROUND

Computing devices have become a very important part of daily life, including mobile devices, such as smartphones, tablets and laptops that are carried throughout the day by the user, as well as computing devices like personal computers usually used in the office or at home in a more stationary manner.

Furthermore, because these devices play a significant role in communication between people, the security of data transfer has become an increasingly important subject. Secured communication can be achieved by, for example, encryption of the messages, using random numbers or any other form of entropy (random sequences of bits and the like). This entropy, however, is hard to generate and high quality/performance entropy generators may require a significant amount of power and/or size.

For computing devices and specifically for mobile computing devices, such random number generation may consume a significant amount of power and/or space, thus forcing manufacturers to integrate lower quality and/or lower performance entropy generators. Alternatively, dongle devices that the user can carry have been proposed for random number generation. However, providing additional devices the user has to carry in order to provide the entropy to the mobile devices or other computing devices is uncomfortable and may discourage adoption by users, thus weakening device security.

SUMMARY

Provided according to the techniques of the present disclosure are devices (i.e., apparatuses) and methods for reliably generating entropy (e.g., random numbers) without unduly consuming potentially limited battery or other power.

According to an example embodiment, provided for herein is are devices for transferring power from a power source to a computing device and methods for providing power and/or entropy to a computing device.

A device for transferring power from a power source to a computing device, preferably a mobile computing device, according to according to an example embodiment of the techniques of the present disclosure, comprises an entropy-generator for generating entropy. The device may be further adapted for transferring the entropy to the computing device when it is connected to the computing device. Furthermore, the device may be configured to power the entropy-generator with power received from the power source.

The power source does not need to be external to the device but it may also be integrated into the device in the form of, for example, a power bar. In any case, the device has the capability of transferring both power and entropy, and thus, is capable of transferring data (the entropy) and power alike. The techniques of the present disclosure are not limited to the case of transferring power and entropy at the same time. Instead, the entropy may be transferred to the computing device while no power is transferred, and/or or power may be transferred to the computing device while no entropy is provided to the computing device.

The connection between the computing device and the device does not need to be a wired connection but it may also be a wireless connection for transferring power and/or for transferring the entropy.

The device according to the techniques of the present disclosure may be easily used by a user for powering the computing device, like a smart phone. At the same time, almost unrecognized by the user, the computing device is provided with entropy in the form of, for example, random numbers. The entropy may be further used by the computing device in, for example, encrypting communication or data. Accordingly, the user is not provided with an additional device that he has to carry along with himself and use in case he needs random numbers. Instead, the generation and provision of entropy to the computing device is done in a manner that does not require additional action of the user.

The entropy-generator may be a random number generator or a random bit generator.

Random numbers are considered here to be humanly readable random numbers, for example 1,234 and 1,000, 067. In contrast to this, a random bit generator may generate a sequence of 0's and 1's of a specific length. For example, the random bit generator may generate sequences of 20 bits (or 100 bits or 10000 bits or $10^7$ bits or any other number of bits) with a random sequence of 0's and 1's which can then be used by the computing device. In the same way, the random numbers generated by a random number generator may be used for providing random numbers to the computing device. The provision of either random numbers or random sequences of bits may depend on the circumstances, but may be particularly advantageous for use in processing steps, such as encrypting communication or data.

The term "random" comprises both, pseudo random values (numbers or bits) and real random values (numbers or bits). A pseudo random value is considered a value obtained by techniques that are not truly random, though the pseudo random value generated appears random. This holds, for example, for random number generation algorithms that make use of a specific starting condition which is not preset, like the time of day, the date and the like. Based on this starting condition, an otherwise deterministic algorithm calculates a value. This value is a pseudo random value as it depends on the deterministic algorithm and the starting condition. If both are known, the value could be reproduced and is, therefore, not truly random but only pseudo random. A real random value on the other hand is considered a value that is truly random. For example a value obtained from physical processes, like thermal processes or quantum processes, may be truly random. For such processes, even when exactly knowing their conditions at some point in time, it is impossible to determine the future of the system in a deterministic way. For example, the phase relation of two laser beams where one of them originates from a laser constantly driven above the lasering threshold and the other one originates from a laser driven close to the threshold such that it starts emitting photons at random, is inherently random and cannot be predicted. Likewise, the moment of decay of an atom or the transition between an excited state and a non-excited state of atoms or molecules cannot be predicted and are, thus, truly random and will produce real random values.

In one embodiment, a device according to the techniques of the present disclosure, includes a storage device for storing random numbers after their generation and providing the random numbers to the computing device when the device is connected to the computing device.

The storage device may be provided in the form of a flash storage or other storage device internal to the device. It may also be a storage device that is connectable and de-connectable from the device, but in any case, can be provided with the entropy generated by the entropy generator. Accordingly, the entropy generation (which might be quite time-consuming) can be separated from the connection with the computing device allowing a fast transfer of entropy to the computing device once it is connected to the same, as the entropy is "pre-generated". In other words, the entropy may be generated, stored in the storage device, and transferred to the computing device when device configured according to the present disclosure is connected to the computing device.

Further, a device according to the techniques of the present disclosure may be adapted to provide the entropy to the computing device depending on a condition, the condition comprising at least one of an amount of entropy already on the computing device, a request for entropy from the computing device being received at the device, or the power status of the computing device, among other conditions.

As random numbers are not always needed at the computing device, providing the entropy to the computing device dependent upon specific conditions increases the control of whether or not and how many random numbers are transferred to the computing device once it is connected to the device.

Moreover, the device may be adapted to transfer power and entropy to the computing device independent from each other.

This means that the device can either transfer power or transfer entropy or transfer both, power and entropy, to a computing device when it is connected to the computing device. This allows the device to, for example, only transfer power when it is necessary. If, for example, the battery of a smart phone is already completely charged, it does not make sense to transfer significant amounts of power to this computing device. However, it may still be necessary to provide the entropy in the form of random numbers or the like to the computing device, which can then be facilitated independently from the power not provided at this point in time to the computing device. On the other hand, there may already be sufficient entropy provided to the computing device but the battery of the computing device is not yet fully charged. In this case, providing entropy may not be initiated at all or may be stopped once there is sufficient entropy provided to the computing device, but powering the computing device or charging the battery of the computing device may continue until it is fully charged or no further power is required. This embodiment may ensure that entropy is provided as needed to the respective computing device, thereby avoiding unnecessary data transfer and/or unnecessary power transfer.

According to one embodiment, the device comprises a port for directly connecting it with a wall socket, wherein the device comprises a port for connecting it with a plug that is directly connectable with a wall socket, or wherein the device is a connecting cable for connecting it with a power connector on the one side and with the computing device on the other side.

With this, different embodiments of the device may be provided that are advantageous depending on the circumstances and their respective uses by the user.

In an alternative embodiment, the device comprises a power bar for powering the computing device and wherein the entropy-generator can be powered with power from the power bar.

A power bar is considered to be a device that comprises its own power source, for example in the form of solar cells or a battery. This power bar cannot only be used for powering the computing device but it can also be used for transferring power to the entropy generator for allowing it to generate entropy. This device is usually carried along with the user, for example when he wants to spend longer times outside with his mobile computing device. The integration of a corresponding entropy generator with the power bar does not negatively impact the user, and thus, allows for providing entropy to the computing device in a manner (almost) unnoticed by the user, thereby not providing any discomfort.

According to the techniques of the present disclosure, the entropy-generator may include at least one of a processing circuit for generating pseudo entropy values and an entropy-chip for generating real entropy values using a physically random process. The term "chip" may refer to any hardware component(s) (like electronic or photonic or combinations of the same) that are adapted for generating real entropy values.

A processing circuit for generating pseudo entropy values is, preferably, a combination of hardware and/or software components that make use of program code to generate random numbers, for example, based on the time of day as an initializing value. Those numbers, as close as they may approximate random numbers, are not real random numbers and are thus only "pseudo entropy values," in contrast to real entropy values that are completely random.

An entropy-chip for generating real entropy values using a physically random process is thus understood to be a chip or other combination of software and/or hardware that generates random values or entropy values making use of a physical process that takes place preferably on this entropy-chip and yields truly random values. This can, for example, comprise arbitrary interference values of sources of laser light where the sources or at least one of the sources is powered to a value almost reaching and only occasionally exceeding the lasering threshold. Thereby, a random phase relation between the two signals is generated, allowing for generating real random values of entropy. A corresponding system in the form of the optical component is described in EP 19382318.4 owned by the applicant, the content of which is herewith incorporated by reference in its entirety.

Sources of entropy or entropy generators are also known from WO 2019/086730 A1, the content of which is herewith incorporated by reference in its entirety.

In the present disclosure, a procedure for the physical generation of random numbers is described where the procedure comprises the steps of: modulating the gain of a vertical cavity surface emitting laser periodically from the lower threshold to the upper threshold and back; keeping the round-trip gain positive for a longer period than the cavity round-trip time; keeping the net gain per round trip negative for a longer period than the cavity round trip time to create random amplitude pulses; detecting optical pulses; converting optical pulses to electrical analog pulses; and digitizing electrical analog pulses into random numbers. The physical components used to realize this procedure may be used according to the techniques to the present disclosure as a source of entropy or as an entropy generator.

A further random number generator or entropy generator is described in U.S. Pat. No. 9,218,160 B2, the content of which is herewith incorporated by reference in its entirety.

The techniques of the present disclosure provide for a process for generating random numbers using a quantum random number generator. The process comprising the steps of: a) operating a laser in single mode and high modulation bandwidth through the use of an electrical pulse driver to produce phase randomized optical pulses, b) transforming the phase randomized optical pulses produced in a) into optical pulses with random amplitude, and c) detecting the resulting random amplitude signals via a fast photodiode, so as to thereby generate random numbers based solely on the random amplitude signals. The thus generated random numbers can be used in the context of the techniques of the present disclosure.

While the first alternative of the processing circuit generating pseudo entropy values might be less energy consuming, the randomness of the entropy generated with the entropy-chip is more accurate, thereby reducing the risk of deciphering the respective entropy (e.g. in the form of random numbers or the like) and preventing malicious attacks.

A method for providing power and/or entropy to a computing device according to the techniques of the present disclosure comprises connecting the computing device with a device for transferring power from a power source to the computing device, wherein the device comprises an entropy-generator for generating entropy. The method further comprises powering the entropy-generator with power received from the power source and generating entropy by the entropy-generator. The method also comprises transferring at least one of power and entropy to the computing device while the device is connected with the computing device.

This method allows for providing the computing device with entropy as needed in a manner (almost completely) unnoticed by the user, thereby not causing any discomfort or requiring any further action of the user for providing the needed entropy for, for example, encrypting his communication.

In one embodiment, power and entropy are transferred independent from each other from the device to the computing device.

Thereby, power and entropy are only provided to the computing device as needed. For example, where the computing device is fully powered, no power is provided to the same, but as long as no sufficient entropy is provided on the computing device, entropy can still be provided to the same.

Furthermore, the entropy-generator may generate either random numbers or random bits.

Random numbers or random bits (specifically a random sequence of bits of given length) may be advantageously used by further applications in, for example, encrypting communication or solving randomized algorithms.

Moreover, the device may provide the entropy to the computing device depending on a condition, the condition comprising at least one of an amount of entropy already on the computing device, a request for entropy from the computing device being received at the device, or the power status of the computing device.

Accordingly, unintended or unneeded generation and provision of entropy to the computing device may be avoided, thereby saving memory at the computing device and saving power that would be used for generating unintended or unneeded entropy.

Still further, the entropy-generator may comprise at least one of a processing circuit that generates pseudo entropy values and an entropy-chip that generates real entropy values using a physically random process.

While the processing circuit for generating pseudo entropy values usually will require less power, the entropy-chip generating real entropy values results in more reliable entropy values, like random numbers being completely arbitrary, thereby increasing the security of, for example, communication encryption or data encryption. The processing circuit for generating pseudo entropy values and the entropy-chip may be used concurrently or independently from each other depending on the application of the entropy intended.

In a further embodiment the entropy-generator generates entropy when the device is connected with a power source, stores the generated entropy in a storage device of the device, and the entropy is transferred from the storage to the computing device when the computing device is connected with the device.

Accordingly, the entropy may be generated in a preventive manner, making the transfer of the entropy to the computing device faster once a connection is in fact established.

A preferred entropy generator may include one or more physical components and/or one or more software components. The entropy generator might, for example, be realized as a processing circuit and associated hardware components, like a memory and corresponding software for generating (pseudo) random numbers (or entropy in general) using program code. Program code for generating random numbers is, in principle, known to the skilled person. This program code may be used in its ordinary way in the entropy generator. This may include generating the random numbers using a specific initializing condition, such as the current time, date or any other appropriate initializing value base on which the program code or software will then generate the entropy. As the entropy generated with this entropy generator, for example in the form of random numbers, is based on an initializing condition and further processing of the data obtained from this initializing condition using a well-defined programming code, the generated random numbers are not really random and are, therefore, pseudo random numbers.

In another preferred embodiment, the entropy generator may comprise an entropy-chip for generating (real) entropy values. The term "chip" in this regard may not be considered to refer to a processing chip in the manner as usually implemented in computing devices. Rather, this may be considered to refer to an integrated component that generates (real) entropy values or random values. This may comprise an entropy-chip making use of a physical process that is inherently random, such as a quantum process or a thermal processes. This may also comprise using noise signals for generating (real) entropy values. In this regard, systems may be preferable that make use of quantum processes like random interference signals obtained from the phase relation between a reference laser source and a laser source driven at or a little above the lasering threshold. The phase relation between the reference signal and the signal generated by the other laser source is completely random as it is governed by the laws of quantum mechanics and can thus not be predicted, thereby resulting in true random numbers. A specifically preferred entropy generator (or entropy-chip) is the entropy source in the form of the optical component described in EP 19382318.4 owned by the applicant, the content of which is herewith incorporated by reference in its entirety.

The techniques of the present disclosure also provide for, a system for generating random numbers (i.e. the random number generator) that includes an optical component that is adapted to generate two optical signals, and two photodetectors connected to the optical component. The first photodetector is adapted to receive the first optical signal and to generate a first electrical signal based on the first optical signal and the second photodetector is adapted to receive the second optical signal and to generate a second electrical signal based on the second optical signal. The optical component is adapted to generate first and second optical signals that randomly result in first and second electrical signals where the first and second electrical signals are either equal or one is larger than the other. The photodetectors are adapted to transmit the first and second electrical signals to a comparator, wherein the comparator is adapted to provide an output based on a comparison of the first and second electrical signals, thereby providing the random number. The thus output random numbers may be a random sequence of bits.

In any case, the entropy generator is provided in the device for generating entropy either in the form of random numbers and/or in the form of a random sequence of bits. The latter refers to a sequence of bits, i.e., 0's and 1's, obtained from the entropy-generator whereas the first one, i.e., the generation of random numbers, may be considered to refer to random numbers that are humanly readable. Generation of either the first or the second may comprise further processing of the original signal specifically in the case of an entropy-chip used for generating real random values as those values will usually have to be digitized. Therefore, the entropy generator may be considered to include additional components, such as a comparator and a digitizer or any other components allowing for translating the physical signal (for example the interference signal of two laser sources) into digital values. Those digital values may then be represented as in fact random numbers or as any sequence of bits comprising 0's and 1's. Post-processing of the raw digital values might also be included in the form of randomness extractors. The specific details of these randomness extractors are not provided here since they are well known to the skilled person in the field.

The entropy may be generated "on the fly", meaning that when the device comprising the entropy generator is connected to a power source and a computing device, the entropy generator generates entropy and provides the same to the computing device only as long as there is a connection established.

Alternatively, the device may comprise a storage device that is operatively connected to the entropy generator and to which the generated entropy (e.g. in the form of random numbers or a sequence of bits) can be transferred and in which it can be stored. For this purpose, the storage device may be considered to be a nonvolatile storage, such as a Universal Serial Bus (USB) storage device. The entropy can be generated in this case without a connection or independent of a connection to a computing device and can be stored in the storage device. The stored entropy may then be, for example, transferred to a computing device. Furthermore, additional components may be provided that manage or supervise, or in any other way control, the provision of the entropy stored in the storage device to the computing device. The component may also be connected to the entropy generator in order to manage the provision of entropy from the entropy generator either to the storage device or directly to the computing device.

The entropy may be provided to the computing device for example to a specifically dedicated storage or to an application running on the computing device. On the computing device, the entropy may be further used for, for example, encryption processes for encrypting data and/or communication or for solving randomized algorithms as in financial forecasting or in gaming.

In this regard, it is noted that there are embodiments where the entropy generator generates entropy when the device is connected to a power source (e.g. external to the device). Generated entropy can then be provided to the storage device for later use, specifically for later transfer to a computing device. The amount of entropy generated (for example the amount of random numbers) may be controlled by the component in order to appropriately manage the available storage in the storage device. For example, the entropy generation with the entropy generator may not be continued in case the storage capacity of the storage device is reached. The component may set a threshold for the entropy generation by the entropy generator to be, for example, 50% to 90% or 60% to 85% or specifically 80% of the storage capacity of the storage device. When this threshold is reached, entropy generation may be stopped.

Furthermore, the component may manage the transfer of entropy, either from the entropy generator and/or the storage device to the computing device, based on one or more conditions. For example, whether or not entropy is transferred from the device to the computing device might depend on the amount of entropy already on the computing device. For example, if the computing devices includes a dedicated storage for receiving and storing the entropy, no entropy may be transferred to the computing device when this dedicated storage has reached its storage capacity, even if the computing device is connected to the device.

Alternatively or additionally, entropy may only be generated and/or transferred from the device to the computing device in case a corresponding request for entropy is received from the computing device at the device, for example at the component. In response to such a request, the component may cause the entropy generator and/or the storage device to generate and/or transfer entropy to the computing device. Furthermore, there can be other conditions on which the provision of entropy to the computing device may depend. For example, entropy may only be provided if a specific threshold of available power at the computing device is exceeded. For example, if the computing device needs to load power, power is transferred via the device to the computing device but the transfer of entropy may be suspended until a minimum threshold of power available at the computing device is reached. For example, if the computing device connected to the device has less than 30%, less than 20%, or less than 10% of its battery charged, no entropy is transferred to the computing device even though the computing device may have requested entropy. If this threshold is exceeded, the entropy may be transferred (in addition to the power, for example) to the computing device.

The component may further control the speed at which the entropy is either generated at the entropy generator and/or transferred to the computing device (either from the entropy generator directly or from the storage device). This control may also depend on the conditions mentioned above and may result in a higher amount of entropy being transferred per time unit when the computing device has more available power.

The component may also comprise hardware and/or software components (in the form of programming or the like) that allow for monitoring the entropy generator and/or the storage device. This monitoring may comprise examining the results of the entropy generated by the entropy generator for their randomness. For example, if the component detects a shift in the probability distribution of the entropy generated by the entropy generator, a diagnostic may be performed in order to, for example, detect and potentially correct the deficiency. Furthermore, the component may post-process the entropy generated by the entropy generator while or immediately after the entropy is generated, and/or when the entropy has been stored in the storage device. This post-processing may comprise, for example, determining the probability distribution of the original signal that generated the random numbers, and may also comprise deciding for each random value generated (for example for each random number generated) whether it is to be transferred to a computing device. For example, it may be that the computing device only makes use of random numbers exceeding a specific threshold. This threshold may, for example, be associated with a corresponding minimum value of the random number like, for example, the random number being larger than 1 billion. For any random number generated by the entropy generator, the component may check whether this threshold is exceeded, and if not, may discard the respective random number by, for example, deleting it from the storage device.

Additionally, the component may control work of the entropy generator by, for example, controlling whether the entropy generator is activated or not. This may depend on, for example, an amount of power available at a power source internal to the device or on a request for entropy received from a computing device. If too little power is left (e.g. less than 50%, less than 30%, less than 25%, less than 20%, or less than 10%) at the internal power source, the entropy-generator may not be activated or may be deactivated. Further, entropy may only be generated by the entropy-generator if a corresponding request is received from a connected computing device.

DETAILED DESCRIPTION

Figure 1:
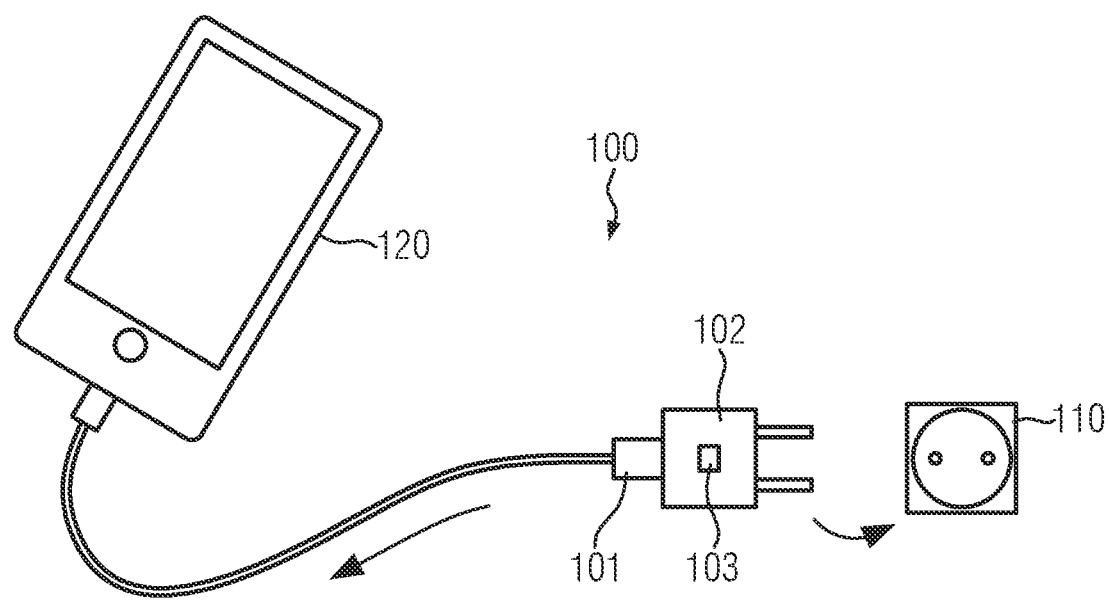
FIG. 1 shows a device for transferring power from a power source to a computing device according to a first example embodiment.

FIG. 1 shows a device 100 for transferring power from a power source (shown as wall socket 110 in FIG. 1) to a computing device 120.

The power source in the form of a wall socket 110 is not to be understood to be limiting. There may also be other power sources (stationary and/or mobile/movable) that could be used for providing power that is then transferred via the device 100 to the computing device 120. This holds, for example, for power sources in the form of batteries, power bars, or other devices that only provide an amount of power that can be used for powering the computing device. The device 100 is thus to be understood to be a device that either comprises or is external to the power source and participates in the transfer of power from the power source to the computing device 120.

This means that power can be transferred via this device 100 to a connected computing device 120 but not necessarily that the device 100 serves as the source of the power. For example, power may be provided via the device 100, but under certain conditions, no power is actually provided by the device, and under other conditions, power is provided by the device to a connected computing device 120. For example, if the computing device is already fully charged, no transfer of power would be necessary, and in this case, no power is transferred to the computing device via the device 100. It is also not necessarily required that, in use, the device 100 would permanently transfer power from the power source to the computing device 120, Instead, the device 100 according to the techniques of the present disclosure is only intended to at least have the capability of transferring power from a power source 110 to the computing device 120.

The computing device 120 is shown in the figures as a mobile computing device in the form of a smart phone. This, however, is not intended to be limiting. The computing device may be any computing device. This holds not only for computing devices in the form of mobile computing devices but may also be considered to hold for stationary computing devices like personal computers. If the computing device is a mobile computing device, this may refer to a smart phone, a laptop, a tablet computer or any other mobile computing device a user may carry along with him. Furthermore, devices like headsets and/or microphones (specifically wireless headsets and/or microphones) may be considered as "computing devices" as used in the present disclosure, as long as they process data (like voice data). Thereby, the local transfer between the headsets and/or microphones to the other devices, like a laptop, can be secured.

Alternatively, a whole car may be considered a "computing device" for purposes of the present disclosure. Specifically, electric cars with their computing components may be considered "computing devices" for purposes of the present disclosure. These can, like other computing devices as described in the following, be loaded with electrical power, and at the same time, be loaded with random numbers. With this, the security of electric cars can be increased. For example, with this the communication with external computing devices or the functionality of an autopilot can be secured using the loaded random numbers.

Likewise, embodiments are provided according to which a car acts as a device for transferring power and entropy to another computing device. The computing device in this case may be a smartphone that is powered using, for example, a USB-connector provided by the car. At the same time, via the connector, entropy can be provided to the computing device which may be used in order to secure wireless communication of the computing device with the car (for example via Blue-Tooth).

In contrast to stationary computing devices, the mobile computing devices may be seen to be any computing device that have their own power source integrated in the form of, for example, a battery that is adapted to fully power the computing device.

According to the techniques of the present disclosure, the device 100 does not only comprise components for transferring power from a power source to the computing device 120, but it also comprises an entropy generator 103 that can generate entropy. In the context of the techniques of the present disclosure, entropy is considered to refer to anything that is random, specifically random numbers or random sequences of bits. The random numbers and the random sequences of bits may have arbitrary length and can be generated by the entropy generator in any manner deemed suitable, including the generation of pseudo random numbers by, for example, making use of specific hardware and software components that use program code to generate random numbers based on, for example, initial values like the date or time of day. Other example embodiments of the entropy generator may make use of actually random or almost random physical processes like interference, meta stability in transistors, electronic or thermal noise, or random oscillation in chaotically coupled oscillators. More generally, entropy generator 103 may use random quantum physical processes or random statistical (macroscopic) physical processes like thermodynamic processes.

In any case, the entropy generator does not necessarily need to be limited to one specific implementation, but a plurality of implementations of the entropy generator may be used without deviating from the concepts of the present disclosure.

According to the techniques of the present disclosure, the entropy generator 103 is, in any case, powered by the power received at the device 100 from the power source 110 and/or the power available at the device 100. If the power source is integrated into the device (e.g., embodiments of the device in the form of a power bar with a corresponding entropy generator, as will be explained later) this means that the device itself, with its integrated power source, powers the entropy generator for generating the entropy. In cases where the power source is external to the device 100, the power received from this power source may be transferred to the computing device 120 and some of this power may be used for powering the entropy generator. This may include embodiments where no computing device is connected with the device 100, but power from the power source is still used to power the entropy-generator and to generate entropy.

In the depiction of FIG. 1, the device 100 is provided as a device comprising two components. The first component is the plug 102 which is depicted here to comprise the entropy generator 103 and which is further depicted to be connectable to the wall socket, or more generally, the power source external to the device. In FIG. 1, the embodiment is shown where the entropy generator is provided as part of the device that is coupled to the external power source 110 (here in the form of a wall socket). This can be advantageous since those plugs 102 usually have a significant size, and thus, may provide sufficient space for including the entropy generator 103, and potentially associated other hardware and/or software components. The coupling to the external power source may be provided directly (i.e. without further intermediate devices) or indirectly by, for example, coupling the device comprising the entropy generator with a cable that is then also coupled with the external power source.

It is intended that the device 100 does not need to be implemented as a combination of plug and cable. Rather, the device 100 may also be realized by either only the plug with the entropy-generator or only the cable provided with the entropy-generator.

Another embodiment is constructed such that the entropy generator 103 and all corresponding components are not integrated in the plug but in the cable 101 which connects the plug with the computing device 120. The cable 101 may comprise a first port connectable to a plug (like plug 102) or any other device that may provide or transfer power on the one side and a port connectable to the computing device on the other side. In the case of this embodiment, the cable 101 is adapted to transfer power to the computing device. Additionally, it is adapted to transfer data in the form of entropy to the computing device, where the entropy is generated by the entropy-generator included in the cable. A specific embodiments of an entropy generator is an entropy source in the form of the optical component described in EP 19382318.4 owned by the applicant, the content of which is herewith incorporated by reference in its entirety.

Any circuitry for hardware components necessary for powering the entropy-generator can thus be provided in a device that is directly connectable to an external power source, like a wall socket, or it can be included in a device (in the form of a cable 101) that is not directly connectable to the power source. The ports of the cable 101 might be USB ports, mini USB ports or any other realization deemed appropriate. Also, lightning connectors may be used. Furthermore, in the embodiment where the device is provided in the form of a cable 101, it might provide a first port that is different from the second port. For example, one port of the cable 101 may be embodied in the form of a USB connector whereas the other port is provided in the form of a mini USB connector.

The entropy generator and any corresponding software and/or hardware might be embodied in the port having the larger physical dimensions and also have sufficient room available for including those components. In other embodiments, however, the respective entropy generator and associated components may be provided either in the port having smaller physical dimensions and/or may be provided as part of the flexible portions of the cable 101. This can be achieved with integrated and/or printed circuitry.

The explanations with respect to the entropy generator as provided in conjunction with FIG. 1 are applicable to other embodiments described in the further description.

Figure 2:
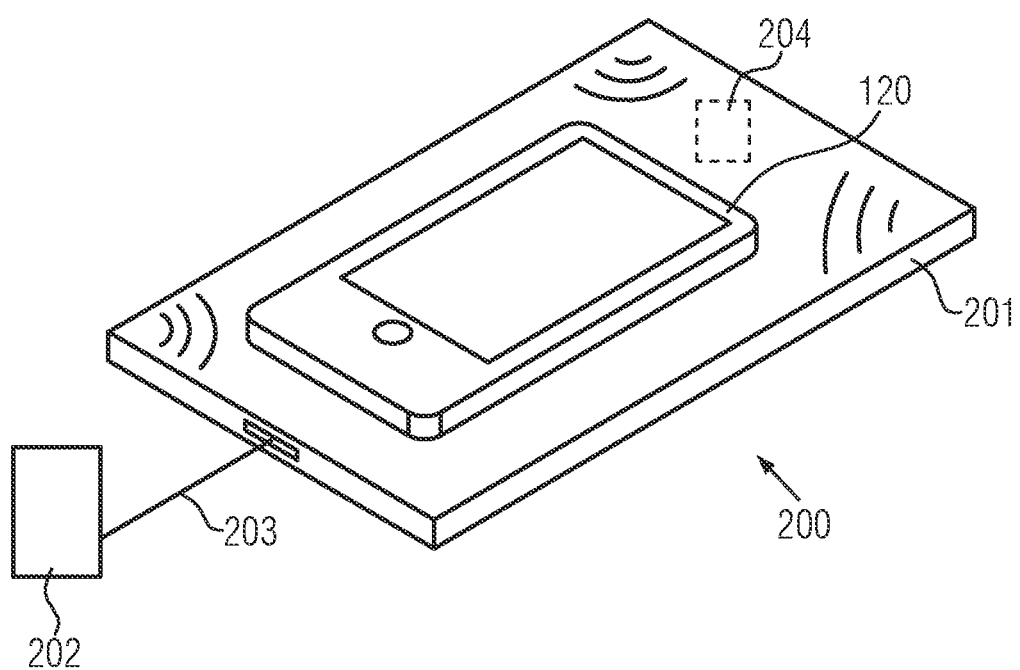
FIG. 2 shows a device for transferring power to a computing device according to a second example embodiment.

FIG. 2 shows a further embodiment where the device 200 is a device for wirelessly transferring at least power to the computing device 120. This may be provided using the commonly known technique of induction charging using, for example, a plate 201 that comprises an inductivity via which (i.e. using electromagnetic fields) power can be transferred to the computing device in a wireless manner when positioning the computing device near, on, or at the plate 201. It goes without saying that instead of a plate 201, any other shape of the device may be used.

The device 200 further includes the entropy generator 204. According to the example embodiment of FIG. 2, entropy generator 204 is integrated into the plate, attached to the plate, or provided to the plate in any other way. The entropy generated with the entropy generator may be transferred to the computing device also in a wireless manner by providing a corresponding modulated signal and transferring it, for example, via a Bluetooth connection. Alternatively, the entropy may be provided to the computing device 120 using a cabled connection. In this case, the entropy generator may in fact be integrated into a cable as explained with respect to FIG. 1 or it may be integrated in the device 200 and the cable may only be used for transferring the data.

Also shown in the embodiment according to FIG. 2 is a power source 202 and a connecting cable 203 connecting the device 200 with the power source. This is just provided for explanatory reasons as the device 200 in the embodiment of FIG. 2 may also need some kind of connection to a power source (or an internal power source) with which it can be powered and the power of which can be transferred to the computing device.

Figure 3:
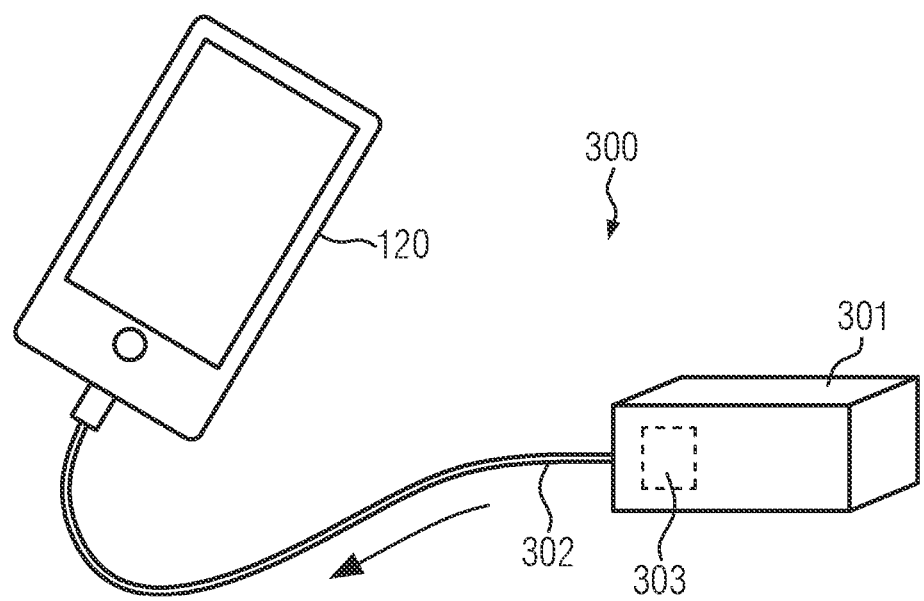
FIG. 3 shows a device for transferring power from a power source to a computing device according to a third example embodiment where the device includes a power bar.

FIG. 3 shows a third embodiment of the device 300 where the device 300 is embodied in the form of a device comprising a power bar 301 and an entropy generator 303. The power bar 301 may be considered to be the power source integrated into the device 300 and may be a power bar or power bank which is, as such, commonly known. Associated with this power bar, attached to the power bar, or connected to it by appropriate connections, is the entropy generator 303 that can generate the entropy for being transferred (for example via the cable 302) to the computing device 120. The power of the power bar 301 may be transferred to the computing device either in a wireless manner or in a wired manner via the cable 302. Likewise, the entropy generated by the entropy generator 303 may either be transferred to the computing device 120 via the cable 302, via any other appropriate connection, or it may be transferred in a wireless manner using, for example, a Bluetooth connection. In this regard, it is noted that, like with FIG. 2, the device or technique for transferring the entropy generated by the entropy generator to the computing device do not need to be the same as those that are used for transferring the power to the computing device. For example, power may be transferred using a cabled connection, while the entropy may be transferred from the device to the computing device using a wireless connection like an infrared port, a Bluetooth connection, a WLAN connection or any other suitable wireless connection. On the other hand, the power may be transferred in a wireless manner while the entropy is transferred in a wired manner using, for example, a connecting cable between the device and the computing device.

The embodiment of FIG. 3 includes a device that has its own power source, and as such, is not permanently connected to an external power source or does, in principle, not require a connection to an external power source for transferring power to the computing device. In this regard, the device 300 may be considered as self standing in that it can provide power and entropy to a computed device 120 independent from an external power source. While in the embodiment shown in FIG. 3 the device 300 comprises a power bar 301, there may also be other alternative embodiments. For example, instead of a power bar, a number of solar cells collecting solar energy may be provided for generating the power that can then be transferred to the computing device and that can be used to power the entropy generator. Also, combinations of the same may be reasonable where a number of solar cells is provided that feed the collected power to a power bar which, in turn, transfers power to a computing device and/or the entropy generator and/or stores it for later using it for such transfer.

Figure 4:
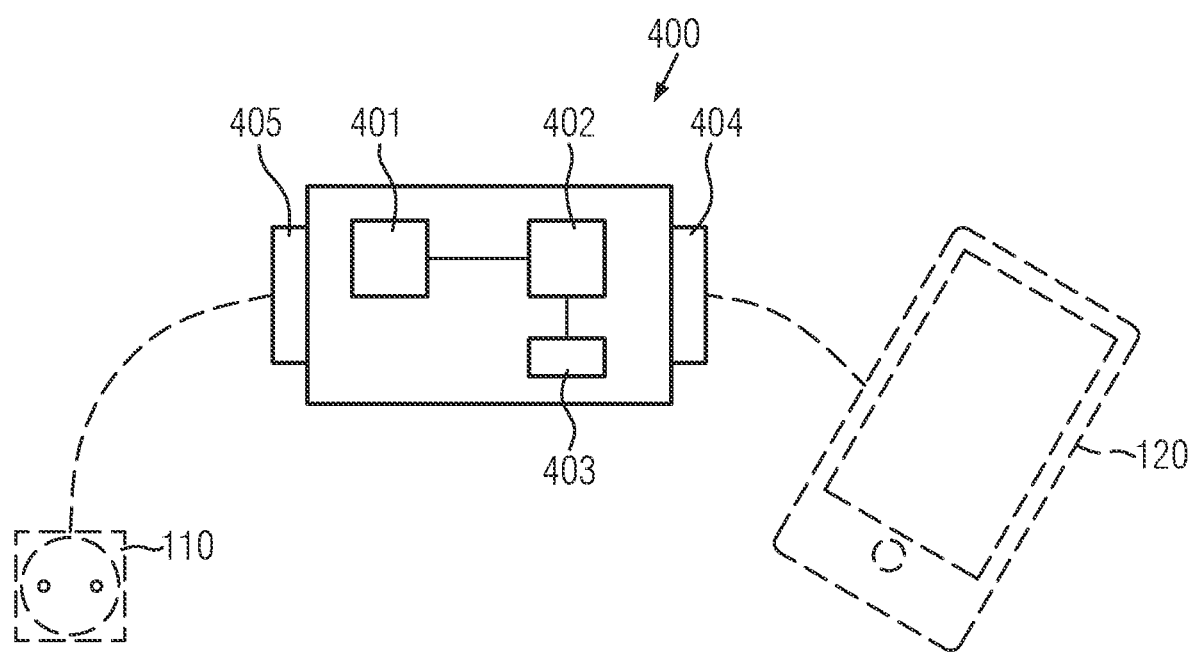
FIG. 4 shows a schematic depiction of the components of the device

FIG. 4 depicts an embodiment schematically showing the components of the device according to one embodiment of the techniques of the present disclosure. The description of FIG. 4 is meant to be combinable with the embodiments already referred to. Specifically, the features referring to how the entropy is generated and how the entropy is further used, as is seen below, may likewise be implemented in the other embodiments referred to already above.

The depiction of FIG. 4 generally depicts the device 400 where there is provided, on the one side, a connection 405 for connecting the device 400 to a power source. On the other side, there is provided a connection 404 for connecting the device 400 to the computing device 120.

The connection 405 for connecting the device 400 to the power source 110 is to be understood as exemplarily only. In the case of embodiments where the power source is provided internal to the device 400, this connection 405 may be seen as an internal connection connecting at least the entropy generator with the respective power source.

Furthermore, the connection 404 may constitute a connection that either provides a wireless or a wired connection for transferring either power and/or entropy. As indicated above, there may be embodiments where different types or kinds of connections for transferring the power are used compared to the connections for transferring the entropy. Thus, the connection 404 may be considered a more general depiction of a general connection for transferring power and/or entropy in any manner considered appropriate. This also includes realizations where the power is transferred via a transfer mechanism different from the transfer mechanism used for transferring the entropy as explained above already.

The device 400 may include further internal circuitry that is responsible for transferring or managing the transfer of power. These components, however, are not described in further detail here as they may be implemented in a manner generally known to the skilled person.

The device 400, however, also includes the entropy generator and corresponding components for facilitating the transfer of entropy to the computing device.

The entropy generator is generally depicted here as element 401 and may include one or more physical components and/or one or more software components. The entropy generator may, for example, be embodied as a processing circuit and associated hardware component, like a memory and corresponding software for generating (pseudo) random numbers (or entropy in general) using program code. Program code for generating random numbers is, in principle, known to the skilled person. This program code may be used in its ordinary way in the entropy generator 401 provided in the device 400. This may include generating the random numbers using a specific initializing condition, such as the current time, date or any other appropriate initializing value, base on which the program code or software will then generate the entropy. As the entropy generated with this entropy generator, for example in the form of random numbers, is based on an initializing condition and further processing of the data obtained from this initializing condition using a well-defined programming code, the generated random numbers are not really random and are, therefore, pseudo random numbers.

Alternatively, the element 401 may comprise an entropy-chip for generating (real) entropy values. The term "chip" in this regard may not be considered to refer to a processing chip in the manner as usually implemented in computing devices. Rather, this may be considered to refer to an integrated component configured to generate (real) entropy values or random values. This may comprise an entropy-chip making use of a physical process that is inherently random like a quantum process or thermal processes. This may also comprise using noise signals for generating (real) entropy values. In this regard, systems may be preferable that make use of quantum processes like random interference signals obtained from the phase relation between a reference laser source and a laser source driven at or a little above the lasering threshold. The phase relation between the reference signal and the signal generated by the other laser source is completely random as it is governed by the laws of quantum mechanics and can thus not be predicted, thereby resulting in true random numbers. A specific example embodiment entropy generator (or entropy-chip) is the entropy source in the form of the optical component described in EP 19382318.4 owned by the applicant, the content of which is herewith incorporated by reference in its entirety.

In any case, the entropy generator is provided in the device for generating entropy either in the form of random numbers and/or in the form of a random sequence of bits. The latter refers to a sequence of bits, i.e. 0's and 1's obtained from the entropy-generator whereas the first one, i.e. the generation of random numbers, may be considered to refer to random numbers that are humanly readable. Generation of either the first or the second may comprise further processing of the original signal specifically in the case an entropy-chip is used for generating real random values as those values will usually have to be digitized. Therefore, the element 401 may be considered to include additional components like a comparator and a digitizer or any other components allowing for translating the physical signal (for example the interference signal of two laser sources) into digital values. Those digital values may then be represented as in fact random numbers or as any sequence of bits comprising 0's and 1's. Post-processing of the raw digital values might also be included in the form of randomness extractors. The specific details of these randomness extractors are not provided here as they are well known to the skilled person in the field.

The entropy may be generated "on the fly", meaning that when the device 400 is connected to a power source and a computing device, the entropy generator generates entropy and provides the same to the computing device only as long as there is a connection established.

Alternatively, the device 400 may comprise a storage device 402 that is operatively connected to the entropy generator 401 and to which the generated entropy (e.g. in the form of random numbers or a sequence of bits) can be transferred and in which it can be stored. For this purpose, the storage device 402 may be considered to be a nonvolatile storage like a USB storage device. The entropy can be generated in this case without a connection or independent of a connection to a computing device and can be stored in the storage device, for example for later transfer to a computing device. Furthermore, additional components 403 may be provided that manage or supervise or in any other way control the provision of the entropy stored in the storage device 402 to the computing device. The component 403 may also be connected to the entropy generator in order to manage the provision of entropy from the entropy generator either to the storage device 402 or directly to the computing device 120.

The entropy may be provided to the computing device to, for example, a specifically dedicated storage or to an application running on the computing device. On the computing device, the entropy may be further used for, for example, encryption processes for encrypting data and/or communication or for solving randomized algorithms as in financial forecasting or in gaming.

In this regard, it is noted that there are embodiments where the entropy generator 401 generates entropy controlled by the component 403 when the device 400 is connected to a power source 110 (e.g. external to the device 400). Generated entropy can then be provided to the storage device 402 for later use, specifically for later transfer to a computing device. The amount of entropy generated (for example the amount of random numbers) may be controlled by the component 403 in order to appropriately manage the available storage in the storage device. For example, the entropy generation with the entropy generator may not be continued in case the storage capacity of the storage device 402 is reached. The component 403 may set a threshold for the entropy generation by the entropy generator to be, for example, 50% to 90%, 60% to 85%, or specifically 80% of the storage capacity of the storage device 402. When this threshold is reached, entropy generation may be stopped.

Furthermore, the component 403 may manage the transfer of entropy, either from the entropy generator 401 and/or the storage device 402 to the computing device 120, based on one or more conditions. For example, whether or not entropy is transferred from the device 400 to the computing device 120 might depend on the amount of entropy already on the computing device. For example, if computing device 120 contains a dedicated storage for transferring the entropy to, no entropy may be transferred to the computing device when the dedicated storage has reached its storage capacity, even if the computing device is connected to the device 400.

Alternatively or additionally, entropy may only be generated and/or transferred from the device to the computing device 120 when a corresponding request for entropy is received from the computing device 420 at the device 400, for example at the component 403. In response to such a request, the component 403 may cause the entropy generator 401 and/or the storage device 402 to generate and/or transfer entropy to the computing device. Furthermore, there can be other conditions on which the provision of entropy to the computing device may depend. For example, entropy may only be provided if a specific threshold of power available at the computing device is exceeded. For example, if the computing device needs to load power, power is transferred via the device 400 to the computing device 120, but the transfer of entropy may be suspended until a minimum threshold of power available at the computing device 120 is reached. For example, if the computing device connected to the device 400 has less than 30%, less than 20%, or less than 10% power of the battery available, no entropy is transferred to the computing device even though the computing device may have requested entropy. If this threshold is exceeded, the entropy may be transferred (in addition to the power, for example) to the computing device.

The component 403 may further control the speed at which the entropy is either generated at the entropy generator 401 and/or transferred to the computing device 120 (either from the entropy generator directly or from the storage device 402). This control may also depend on the conditions mentioned above and may result in a higher amount of entropy being transferred per time unit based on the amount of power available at the computing device. For example, the more power available at the computing device, the higher the transfer rate of entropy.

The component 403 may also comprise hardware and/or software components (in the form of programming or the like) that allow for monitoring the entropy generator 401 and/or the storage device 402. This monitoring may comprise examining the results of the entropy generated by the entropy generator for their randomness. If the component 403 detects a shift in the probability distribution of the entropy generated by the entropy generator, for example, a diagnostic may be performed in order to, for example, detect and potentially correct the deficiency. Furthermore, the component 403 may be provided in order to further process the entropy generated by the entropy generator either while or immediately after the entropy is generated and/or when it has been stored in the storage device 402. This post-processing may comprise, for example, determining the probability distribution of the original signal that generated the random numbers and may also comprise deciding, for each random value generated (for example for each random number generated) whether it is to be transferred to a computing device. For example, it may be that the computing device only makes use of random numbers exceeding a specific threshold. This threshold may be, for example, associated with a corresponding minimum value of the random number like, for example, the random number being larger than 1 billion. For any random number generated by the entropy generator, the component 403 may check whether this threshold is exceeded, and if not, may discard the respective random number by, for example, deleting it from the storage device 402.

Additionally, the component may control work of the entropy generator 401 by, for example, controlling whether the entropy generator is activated at all or not. This may depend for example on an amount of power available at a power source internal to the device (as explained in FIG. 3) or on a request for entropy received from a computing device. If too little power is left (e.g. less than 50%, less than 30%, less than 25%, less than 20%, or less than 10%) at the internal power source, the entropy-generator may not be activated or may be deactivated. Further, entropy may only be generated by the entropy-generator if a corresponding request is received from a connected computing device.

The invention claimed is:

1. An apparatus comprising:
    a charger configured to transfer power from a power source to a computing device;
    an entropy-generator configured to be powered by the power source and generate entropy to be transferred to the computing device; and
    a connection to the computing device configured to transfer the entropy to the computing device from the entropy-generator,
    wherein the charger is configured to transfer power to the computing device whether or not the entropy-generator is transferring entropy to the computing device, and
    wherein the entropy-generator is configured to transfer entropy to the computing device whether or not the charger is transferring power to the computing device.

2. The apparatus according to claim 1, wherein the entropy-generator comprises a random number generator or a random bit generator.

3. The apparatus according to claim 1, further comprising a storage device configured to store random numbers generated by the entropy-generator and provide the random numbers to the computing device when the apparatus is connected to the computing device via the connection.

4. The apparatus according to claim 1, wherein the apparatus is configured to provide the entropy to the computing device depending on a condition, the condition comprising at least one of an amount of entropy already on the computing device, a request for entropy from the computing device being received at the apparatus, or a power status of the computing device.

5. The apparatus according to claim 1, further comprising a port configured to directly connect to a wall socket, configured to connect with a plug that is directly connectable with a wall socket, or configured as a cable for connecting with a power connector on a first side and the connection on a second side.

6. The apparatus according to claim 1, further comprising the power source, wherein the power source comprises a power bar for powering the computing device and for powering the entropy-generator.

7. The apparatus according to claim 1, wherein the entropy-generator comprises at least one of a processing circuit for generating pseudo entropy values or an entropy-chip for generating real entropy values using a physically random process.

8. The apparatus according to claim 1, wherein the connection comprises a wireless connection.

9. The apparatus according to claim 1, wherein the connection comprises a wired connection.

10. A method comprising:
    connecting a computing device to an apparatus, the apparatus comprising a charger configured to transfer power from a power source to the computing device and an entropy-generator configured to generate entropy;
    powering the entropy-generator with power received from the power source;
    generating entropy via the entropy-generator;
    transferring the entropy from the entropy-generator to the computing device whether or not the charger is transferring power to the computing device; and
    transferring power from the charger to the computing device whether or not the entropy-generator is transferring entropy to the computing device.

11. The method according to claim 10, wherein the entropy-generator generates one or more of random numbers or random bits.

12. The method according to claim 10, wherein the apparatus transfers the entropy to the computing device depending on a condition, the condition comprising at least one of an amount of entropy already on the computing device, a request for entropy from the computing device being received at the apparatus, or a power status of the computing device.

13. The method according to claim 10, wherein the entropy-generator comprises at least one of a processing circuit that generates pseudo entropy values or an entropy-chip that generates real entropy values using a physically random process.

14. The method according to claim 10, wherein generating the entropy by the entropy-generator comprises generating the entropy when the apparatus is connected with the power source and storing the entropy in a storage device of the apparatus; and
    wherein transferring the entropy to the computing device comprises transferring the entropy from the storage device to the computing device.

* * * * *